(12) United States Patent
Delp et al.

(10) Patent No.: US 11,354,547 B2
(45) Date of Patent: Jun. 7, 2022

(54) SYSTEMS AND METHODS FOR CLUSTERING USING A SMART GRID

(71) Applicant: Toyota Research Institute, Inc., Los Altos, CA (US)

(72) Inventors: Michael James Delp, Ann Arbor, MI (US); Antonio Prioletti, Redwood City, CA (US); Matthew T. Kliemann, Ann Arbor, MI (US); Randall J. St. Romain, II, Ann Arbor, MI (US)

(73) Assignee: Toyota Research Institute, Inc., Los Altos, CA (US)

( * ) Notice: Subject to any disclaimer, the term of this patent is extended or adjusted under 35 U.S.C. 154(b) by 144 days.

(21) Appl. No.: 16/835,895

(22) Filed: Mar. 31, 2020

(65) Prior Publication Data
US 2021/0303916 A1 Sep. 30, 2021

(51) Int. Cl.
*G06K 9/00* (2022.01)
*G06K 9/62* (2022.01)
*G06T 7/11* (2017.01)

(52) U.S. Cl.
CPC ........... *G06K 9/6268* (2013.01); *G06K 9/622* (2013.01); *G06K 9/6232* (2013.01);
(Continued)

(58) Field of Classification Search
CPC ............. G06K 9/00771; G06K 9/6251; G06K 9/6292; G06K 9/6222; G06K 9/00624; G06K 9/00664; G06K 9/00684; G06K 9/036; G06K 9/32; G06K 9/6269; G06K 9/628; G06K 9/629; G06K 9/6814; G06K 2009/00322; G06K 2009/3291; G06K 2209/21; G06K 9/00; G06K 9/00288;
(Continued)

(56) References Cited

U.S. PATENT DOCUMENTS

2005/0175243 A1 * 8/2005 Luo ...................... G06K 9/6292
382/224
2012/0256916 A1 10/2012 Kitamura et al.
(Continued)

OTHER PUBLICATIONS

Yue "An unsupervised grid-based approach for clustering analysis," 2010, Science China Press and Springer-Verlag Berlin Heidelberg (Year: 2010).*
Hickson et al. Efficient Hierarchical Graph-Based Segmentation of RGBD Videos,2014 IEEE Conference on Computer Vision and Pattern Recognition.
(Continued)

*Primary Examiner* — Alex Kok S Liew
(74) *Attorney, Agent, or Firm* — Christopher G. Darrow; Darrow Mustafa PC

(57) ABSTRACT

System, methods, and other embodiments described herein relate to improving clustering of points within a point cloud. In one embodiment, a method includes grouping the points into cells of a grid. The grid divides an observed region of a surrounding environment associated with the point cloud into the cells. The method includes computing feature vectors for the cells that use cell features to characterize the points in the cells and relationships between the cells. The method includes analyzing the feature vectors according to a clustering model to identify clusters for the cells. The clustering model evaluates the cells to identify which of the cells belong to common entities. The method includes providing the clusters as assignments of the points to the entities depicted in the point cloud.

20 Claims, 5 Drawing Sheets

(52) U.S. Cl.
CPC .............. *G06K 9/6267* (2013.01); *G06T 7/11* (2017.01); *G06T 2207/10028* (2013.01); *G06T 2207/20081* (2013.01); *G06T 2207/20084* (2013.01)

(58) Field of Classification Search
CPC .............. G06K 9/0063; G06K 9/00677; G06K 9/00798; G06T 17/05; G06T 2207/30148; G06T 7/001; G06T 2201/0051; G06T 2207/10064; G06T 2207/10096; G06T 2207/30016; G06T 2207/30041; G06T 2207/30104; G06T 2207/30168
See application file for complete search history.

(56) References Cited

U.S. PATENT DOCUMENTS

| | | |
|---|---|---|
| 2013/0121564 A1 | 5/2013 | Kitamura et al. |
| 2014/0247972 A1* | 9/2014 | Wang ................... G06V 20/695 382/133 |
| 2019/0079193 A1 | 3/2019 | Gunnam |
| 2019/0108639 A1 | 4/2019 | Tchapmi et al. |
| 2019/0313110 A1 | 10/2019 | Mammou et al. |

OTHER PUBLICATIONS

Arase et al., "Rethinking Task and Metrics of Instance Segmentation on 3D point clouds", found at: arXiv:1909.12655v1 [cs.LG] Sep. 27, 2019.

\* cited by examiner

SYSTEMS AND METHODS FOR CLUSTERING USING A SMART GRID

TECHNICAL FIELD

The subject matter described herein relates, in general, to systems and methods for clustering points in a point cloud, and, more particularly, to using a grid to group and characterize the points from which a machine learning algorithm identifies clusters.

BACKGROUND

Various devices that operate autonomously or that provide information about a surrounding environment use sensors to perceive obstacles and other aspects of the surrounding environment. For example, a robotic device may use information from the sensors to develop an awareness of the surrounding environment in order to navigate through the environment and avoid hazards. In particular, the robotic device uses the perceived information to differentiate between various entities, track the entities, classify the entities, and so on. However, the ability to use this information relies on the ability of the underlying systems to accurately and efficiently process the information into the noted perceptions. Moreover, certain forms of information can be more complex, and/or computationally intensive to process. As one example, point cloud data, which may be generated by a LiDAR, stereo camera, radar, or similar sensor, is generally robust data that includes many points of data indicating spatial information in addition to further attributes. Thus, the point cloud includes a large amount of data that can be computationally intensive to store and process.

Therefore, leveraging point cloud data to perceive a surrounding environment can also suffer from difficulties, such as processing complexity, data handling, power requirements on mobile platforms, and so on. These difficulties can be further exacerbated in the context of systems that operate in dynamic environments, such as autonomous vehicles/robots, and rely on the ability to quickly process information to distinguish between various aspects of the environment and make decisions therefrom. As such, many difficulties associated with efficiently processing point cloud data persist that may result in reduced situational awareness for a device, and, thus, difficulties in navigating or performing other associated functions.

SUMMARY

In one embodiment, example systems and methods relate to an improved approach to clustering points within a point cloud. As previously noted, because of various attributes of point cloud data (e.g., large data volume), efficiently processing such data can be difficult, especially within the context of a mobile platform that relies on quick determinations about surrounding entities (e.g., moving objects).

Therefore, in one embodiment, a system is disclosed that improves the processing of point clouds to cluster points associated with entities. For example, in one aspect, the disclosed system initially acquires the point cloud from a sensor. The sensor may be a light detection and ranging (LiDAR) sensor or another sensor that is capable of producing a point cloud. The point cloud itself is generally a collection of points within a three-dimensional space that defines at least a distance at which a surface/object/entity is detected relative to a scanning sensor. In further aspects, the points within the point cloud may include further attributes, such as intensity, reflectivity, and so on, and/or may be combined with information from further sources.

In any case, the disclosed system may initially overlay a grid onto a geometric space of the point cloud in order to then group the points into discrete cells of the grid. This provides the disclosed system with a mechanism for grouping the points together into the cells from which the groups of points may be further assessed. For example, the disclosed system may compute a feature vector for, in one embodiment, each of the cells in the grid. The feature vector characterizes attributes of the points within a respective cell in a way that provides for determining correspondence/ similarities with other cells. Thus, the feature vectors are comprised of a plurality of different cell features.

The disclosed system may then provide the feature vectors as, for example, embedded aspects of the grid into a clustering model. The clustering model is a machine learning algorithm that uses the feature vectors and the information included therein to assess which cells should be clustered together or not. Accordingly, the clustering model learns through, in one approach, a supervised similarity learning process to cluster the grid cells and, thus, the corresponding points. The clusters generally correspond to different entities in the surrounding environment, such as vehicles, pedestrians, buildings, and other objects. Thus, the disclosed system can further leverage the clusters to track the objects, classify the objects, and/or map the objects in the surrounding environment in support of broader functionality associated with the system (e.g., autonomous maneuvering of a vehicle, etc.). In this way, the system improves clustering by providing a plurality of features for the cells on which the clustering model may rely to provide clusters instead of individually analyzing each separate point in the point cloud.

In one embodiment, a clustering system for improving the clustering of points within a point cloud is disclosed. The clustering system includes one or more processors and a memory communicably coupled to the one or more processors. The memory stores a sensor module including instructions that, when executed by the one or more processors, cause the one or more processors to group the points into cells of a grid. The grid divides an observed region of a surrounding environment associated with the point cloud into the cells. The sensor module includes instructions to compute feature vectors for the cells that use cell features to characterize the points in the cells and relationships between the cells. The memory stores a clustering module including instructions that, when executed by the one or more processors, cause the one or more processors to analyze the feature vectors according to a clustering model to identify clusters for the cells. The clustering model evaluates the cells to identify which of the cells belong to common entities. The clustering module includes instructions to provide the clusters as assignments of the points to the entities depicted in the point cloud.

In one embodiment, a non-transitory computer-readable medium for improving the clustering of points within a point cloud and including instructions that, when executed by one or more processors, cause the one or more processors to group the points into cells of a grid. The grid divides an observed region of a surrounding environment associated with the point cloud into the cells. The instructions include instructions to compute feature vectors for the cells that use cell features to characterize the points in the cells and relationships between the cells. The instructions include instructions to analyze the feature vectors according to a clustering model to identify clusters for the cells. The clustering model evaluates the cells to identify which of the cells belong to common entities. The instructions include instructions to provide the clusters as assignments of the points to the entities depicted in the point cloud.

In one embodiment, a method for improving clustering of points within a point cloud is disclosed. In one embodiment, the method includes grouping the points into cells of a grid, the grid dividing an observed region of a surrounding environment associated with the point cloud into the cells. The method includes computing feature vectors for the cells that use cell features to characterize the points in the cells and relationships between the cells. The method includes analyzing the feature vectors according to a clustering model to identify clusters for the cells. The clustering model evaluates the cells to identify which of the cells belong to common entities. The method includes providing the clusters as assignments of the points to the entities depicted in the point cloud.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

DETAILED DESCRIPTION

Figure 1:
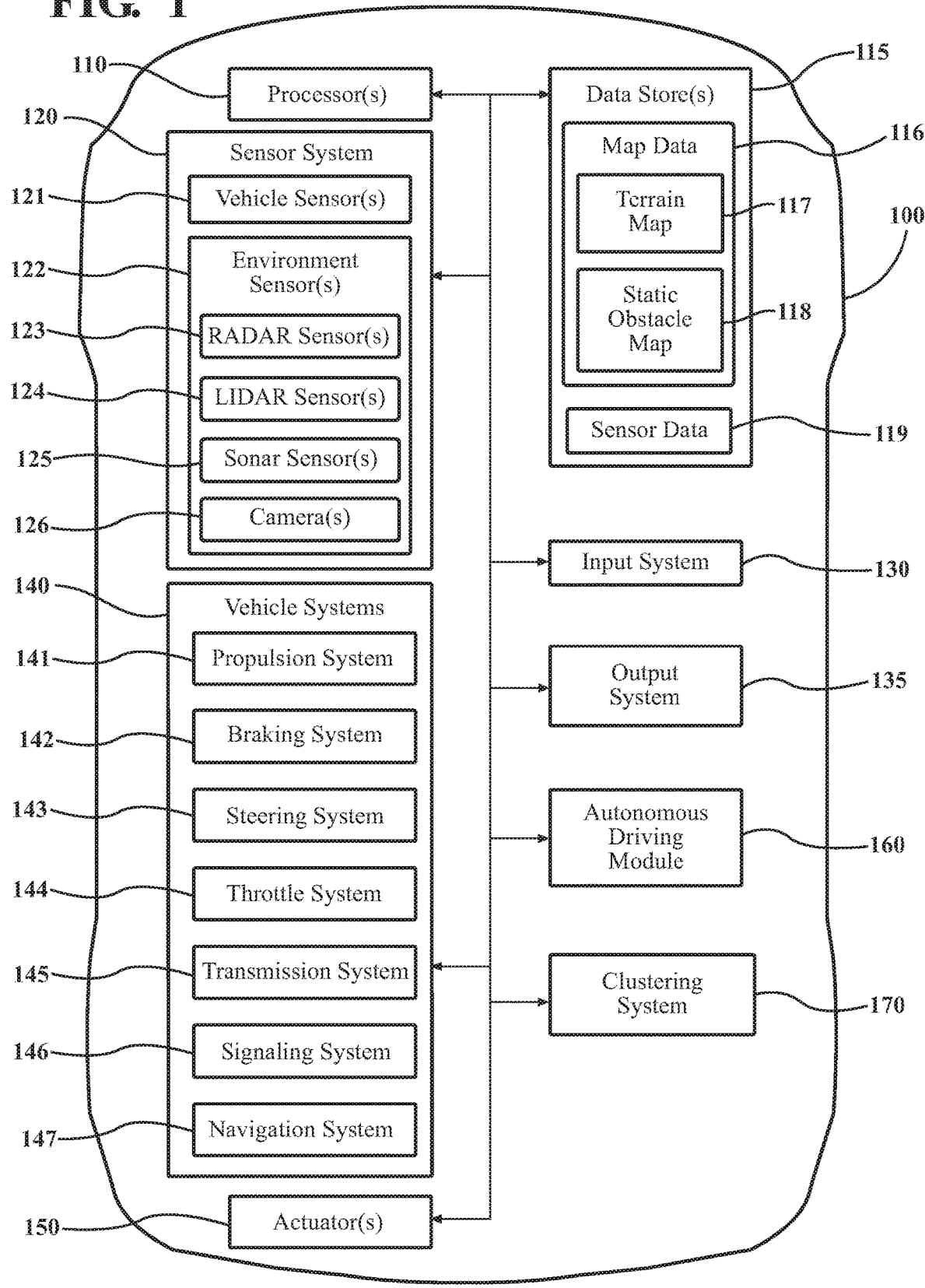
FIG. 1 illustrates one embodiment of a vehicle within which systems and methods disclosed herein may be implemented.

Systems, methods, and other embodiments associated with an improved approach to clustering points within a point cloud are disclosed. As previously noted, because of various attributes of point cloud data (e.g., large data volume), efficiently processing such data by analyzing the possibly millions of different points can be computationally intensive. These difficulties can be especially apparent within the context of a mobile platform that has limited computational resources and/or relies on quickly resolving determinations about surrounding entities (e.g., moving objects).

Therefore, in one embodiment, a clustering system improves the processing efficiency of point clouds to cluster points associated with entities through the implementation of several features, as discussed herein. In one aspect, the disclosed system initially acquires the point cloud from one or more sensors. The sensor may be a light detection and ranging (LiDAR) sensor, a radar, a stereo camera, a monocular camera executing secondary structure-from-motion (SfM) depth routines, or another sensor that is capable of producing a point cloud. The point cloud itself is generally a collection of points within a three-dimensional space that defines at least a distance to detected objects, surfaces, or other entities relative to a scanning sensor. Depending on a particular resolution of a scanning sensor and a field-of-view, the point cloud may include hundreds of thousands of points to millions of points or more. Thus, handling the associated data volume through a segmentation pipeline can be difficult.

This volume of data can be further expanded through fusion with other data sources such as camera images, radar, and so on. As such, the points within the point cloud may include further attributes, such as intensity, reflectivity, RGB values, and so on. In any case, the disclosed system may initially overlay a grid that serves as a spatial index onto a geometric space of the point cloud in order to group the points into discrete cells. The separate cells provide the clustering system with a mechanism for grouping the points together from which the groups of points may be further assessed or summarized without directly comparing and/or computing aspects for the points individually. The individual cells may be regularly shaped rectangles, toxels (i.e., 4D voxels), tessellations, lattices, and other suitable cell geometries (e.g., honeycomb). Alternatively, the clustering system may, in a separate embodiment, not discretize the points into a grid but instead pairs points together or simply leaves the points as individual representations to provide a finer granularity in the representation of the observed space. It should be noted, however, that increasing the granularity of the represented data points (e.g., from large cells to small cells, point pairs, and individual points) may result in increased computational loads with finer representations. Thus, the various implementations may implement different granularities for discretizing the observed space depending on various factors, such as available computing resources.

For example, in one aspect, the clustering system may compute a feature vector for individual ones of the cells in the grid as a way of generalizing the points in the cell. The feature vector characterizes attributes of the points within the cell in a way that provides for determining correspondence/similarities with other cells. Thus, the feature vectors can be comprised of a plurality of different cell features for a cell.

The clustering system then provides, in one arrangement, the feature vectors as an input into a clustering model. The clustering model is a machine learning algorithm that uses the feature vectors to assess which cells should be clustered together or not. Accordingly, the clustering model learns through, in one approach, a supervised similarity learning process to cluster the grid cells and thus the corresponding points. That is, through various learned correlations, the clustering model determines which of the cells are sufficiently similar to cluster together or to exclude from a given cluster.

The clusters generally correspond to different entities in the surrounding environment, such as vehicles, pedestrians, buildings, and other objects, as represented by a multiplicity of points from the point cloud. Thus, the disclosed system can further leverage the clusters to track the objects, classify the objects, and/or map the objects in the surrounding environment in support of broader functionality associated with the system (e.g., autonomous maneuvering of a vehicle, etc.). In this way, the system improves clustering by providing a plurality of features for the cells on which the clustering model may derive the clusters more efficiently.

Referring to FIG. 1, an example of a vehicle 100 is illustrated. As used herein, a "vehicle" is any form of powered transport. In one or more implementations, the vehicle 100 is an automobile. While arrangements will be described herein with respect to automobiles, it will be understood that embodiments are not limited to automobiles but are generally described in relation to automobiles for purposes of description. In yet further embodiments, systems and methods disclosed herein may be implemented in a statically mounted device, an embedded device, or another device that uses point clouds and clusters derived therefrom to perform some function instead of the vehicle 100.

In any case, the vehicle 100 also includes various elements. It will be understood that, in various embodiments, it may not be necessary for the vehicle 100 to have all of the elements shown in FIG. 1. The vehicle 100 can have any combination of the various elements shown in FIG. 1. Further, the vehicle 100 can have additional elements to those shown in FIG. 1. In some arrangements, the vehicle 100 may be implemented without one or more of the elements shown in FIG. 1. While the various elements are illustrated as being located within the vehicle 100, it will be understood that one or more of these elements can be located external to the vehicle 100. Further, the elements shown may be physically separated by large distances and provided as remote services (e.g., cloud-computing services, software-as-a-service (SaaS), etc.).

Some of the possible elements of the vehicle 100 are shown in FIG. 1 and will be described along with subsequent figures. However, a description of many of the elements in FIG. 1 will be provided after the discussion of FIGS. 2-5 for purposes of the brevity of this description. Additionally, it will be appreciated that for simplicity and clarity of illustration, where appropriate, reference numerals have been repeated among the different figures to indicate corresponding or analogous elements. In addition, the discussion outlines numerous specific details to provide a thorough understanding of the embodiments described herein. Those of skill in the art, however, will understand that the embodiments described herein may be practiced using various combinations of these elements.

In either case, the vehicle 100 includes a clustering system 170 that functions to process point cloud data and provide clusters and/or further determinations about the clusters. Moreover, while depicted as a standalone component, in one or more embodiments, the clustering system 170 is integrated with the autonomous driving module 160, one or more environment sensors 122, or another component of the vehicle 100. The noted functions and methods will become more apparent with a further discussion of the figures.

Figure 2:
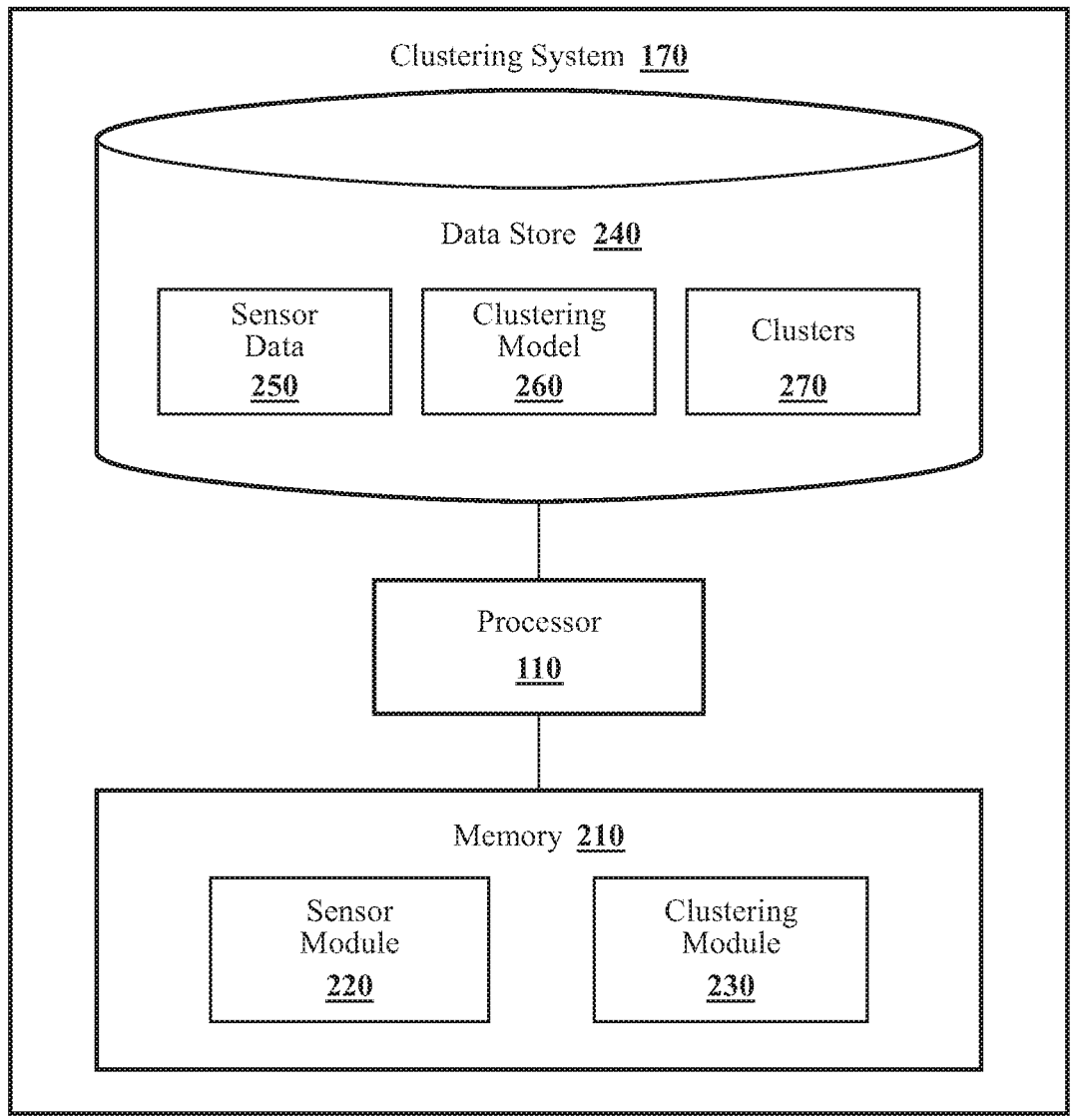
FIG. 2 illustrates one embodiment of a clustering system that is associated with using a clustering model to define clusters within a point cloud.

With reference to FIG. 2, one embodiment of the clustering system 170 is further illustrated. The clustering system 170 is shown as including a processor 110. Accordingly, the processor 110 may be a part of the clustering system 170, or the clustering system 170 may access the processor 110 through a data bus or another communication path. In one or more embodiments, the processor 110 is an application-specific integrated circuit (ASIC) that is configured to implement functions associated with a sensor module 220 and a clustering module 230. In general, the processor 110 is an electronic processor such as a microprocessor that is capable of performing various functions as described herein. In one embodiment, the clustering system 170 includes a memory 210 that stores the sensor module 220 and the clustering module 230. The memory 210 is a random-access memory (RAM), read-only memory (ROM), a hard disk drive, a flash memory, or other suitable memory for storing the modules 220 and 230. The modules 220 and 230 are, for example, computer-readable instructions that, when executed by the processor 110, cause the processor 110 to perform the various functions disclosed herein.

Furthermore, in one embodiment, the clustering system 170 includes a data store 240. The data store 240 is, in one embodiment, an electronic data structure stored in the memory 210 or another data store, and that is configured with routines that can be executed by the processor 110 for analyzing stored data, providing stored data, organizing stored data, and so on. Thus, in one embodiment, the data store 240 stores data used by the modules 220 and 230 in executing various functions. In one embodiment, the data store 240 includes sensor data 250, a clustering model 260, and clusters 270 along with, for example, other information that is used by the modules 220 and 230.

Accordingly, the sensor module 220, in one embodiment, controls the one or more respective sensors to provide the data inputs in the form of the sensor data 250. Additionally, while the sensor module 220 is discussed as controlling the various sensors to provide the sensor data 250, in one or more embodiments, the sensor module 220 can employ other techniques to acquire the sensor data 250 that are either active or passive. For example, the sensor module 220 may passively sniff the sensor data 250 from a stream of electronic information provided by the various sensors to further components within the vehicle 100. Moreover, the sensor module 220 can undertake various approaches to fuse data from multiple sensors when providing the sensor data 250 and/or from sensor data acquired over a wireless communication link. Thus, the sensor data 250, in one embodiment, represents a combination of perceptions acquired from multiple sensors.

In general, the sensor data 250 includes information about a surrounding environment of the one or more sensors that acquire the sensor data 250. That is, the sensor data 250 includes perceptions of the one or more sensors within a field-of-view of the sensor(s) making the perception. Thus, the sensor data 250 includes observations of the surrounding environment that depend on the FOV of the sensor and placement of the sensor in the environment. Within the context of the vehicle 100, the sensor data 250 may include observations of surrounding vehicles, lane markings, pedestrians, curbs, buildings, traffic signs, and so on. Of course, within other contexts (e.g., indoor), the observations embodied within the sensor data 250 may differ. It should be appreciated that the areas perceived by the sensor(s) may encompasses 360 degrees about the vehicle 100 or a narrower perspective. In any case, the sensor data 250 includes information about the surrounding environment of a perceiving sensor.

The sensor data 250 itself includes at least a point cloud. The point cloud is a collection of data points within a geometric space (i.e., a FOV of the observing sensor). For example, in the context of a LiDAR sensor, the data points of the point cloud are measurements of distance from the LiDAR sensor to points in the environment that reflected scanning light (e.g., from a laser of the LiDAR). Thus, the points generally represent detected points on surfaces in the surrounding environment, including buildings, objects, the ground, and so on. While a LiDAR is provided as an example of an originating source of the point cloud, other sensors may also produce sensor data 250 in the form of the point cloud or from which the system 170 may derive the point cloud. By way of example, a radar, stereo camera, sonar, or another sensor may produce the point cloud. In a further arrangement, the clustering system 170 or another system may derive the point cloud from monocular images via a structure-from-motion (SfM) process for depth estimation, a per-pixel depth using machine learning (e.g., learned monocular depth), and so on.

Additionally, beyond depth/location information within the surrounding environment, the points of the point cloud may include further information as an intrinsic attribute of the perceived data point or as fused with the data point via an additional source (e.g., an additional sensor). Thus, the data points may include intensity data, reflectivity data, surface normal information, and so on. The sensor module 220, in one approach, includes instructions that function to fuse the point cloud with additional information. The additional information may be direct observations of other sensors, such as RGB values, radar returns, and so on.

In yet a further aspect, the sensor module 220, the autonomous driving module 160, or another component with access to the sensor data 250 may derive additional information from the sensor data 250 (e.g., images) from which the sensor module 220 may fuse the additional information with the point cloud. By way of example, the autonomous driving module 160 may include a processing module that performs semantic segmentation over images to derive boundaries and/or classifications of entities depicted in the images. The process of semantic segmentation generally identifies assignments of semantic classes for different objects depicted in the image on a per-pixel basis.

Thus, the sensor module 220, in one or more arrangements, projects the semantic classes onto the point cloud in order to correlate the semantic classes with the separate points in the point cloud. This additional information, as well as any other information fused from additional sensor data, facilitates guiding the clustering process as discussed further subsequently. In any case, the sensor module 220, in one or more embodiments, includes instructions that cause the processor 110 to group the points into cells of a grid. The sensor module 220 generates the grid by dividing an observed region of the surrounding environment associated with the point cloud into the cells. In various approaches, the sensor module 220 may implement the grid to have regular cells (e.g., squares/cuboids) on a symmetric layout that overlays the geometric space of the point cloud. In further approaches, the cells may be rectangular or even an irregular shape. In such a circumstance, the sensor module 220 may fit the cells and generally define the grid according to a policy, such as a density fitting approach (i.e., extend cells according to areas with more densely occurring points). For example, in one approach, the clustering system defines the grid according to a particular geometry for the cells. The geometry for the cells may include cubic honeycomb, hexagonal prismatic honeycomb, rhombic dodecahedron, elongated dodecahedron, truncated octahedron, triangular prismatic honeycomb, gyrated triangular prismatic honeycomb, triakis truncated tetrahedral honeycomb, trapezo-rhombic dodecahedra honeycomb, isohedral tilings, or other space-filling polyhedra. In yet further representations, the clustering system may implement the cells to have a 4D representation, such as a toxel (i.e., a temporal voxel).

In any case, the sensor module 220 generates the grid as a spatial index over the geometric space of the point cloud in the surrounding environment. Thus, the grid corresponds with a field-of-view of the particular sensor that generated the point cloud. Moreover, the sensor module 220 may generate the grid as a two-dimensional grid onto which the sensor module 220 projects the points of the point cloud or as a three-dimensional grid that corresponds with the space of the point cloud. Additionally, the sensor module 220, in various approaches, implements the grid as a k-d tree or another data structure that facilitates analysis between nearby cells. Thus, the clustering system 170 can leverage the grid as a mechanism for searching nearby cells when subsequently analyzing cells to determine clusters.

Furthermore, the sensor module 220 may group the points into the cells of the grid by, in one aspect, generating the grid over the space of the point cloud. That is, the sensor module 220 defines the grid within the space, and whichever points align with a cell are grouped or otherwise assigned into that cell. The sensor module 220 then computes feature vectors for the cells. For example, the sensor module 220 analyzes the points within the cell to characterize the points of the cell and may further comparatively analyze separate cells to characterize relationships between the cells. In one embodiment, the sensor module 220 generates cell features for each cell that include inter-cell features and intra-cell features. The intra-cell features identify attributes of individual cells as defined according to points grouped into the cells. Thus, the intra-cell features can include aspects, such as cell coordinates, an RGB value, a LiDAR intensity value, a normal, optical/scene flow (e.g., as calculated from points in the cell), a distance to a sensor, radar reflectivity, a level of free space, texture, staticness, known boundaries (e.g., derived from observed objects known to function as boundaries, such as fences, curbs, etc.), and/or other aspects of the points in a cell that facilitate characterizing the cell. It should be appreciated that one or more of the noted features may use information beyond the data included in a single observation of a point. For example, the scene flow attribute generally characterizes the motion of a point across separate observations of an entity/point. Thus, the sensor module 220 may utilize memory of the cell and/or points therein to characterize motion in the form of scene flow as one attribute. Moreover, the intra-cell features may be computed according to a mean of the grouped points of a cell, or another heuristic that characterizes a predominant value for the cell feature of a particular cell.

The inter-cell features identify relative attributes between respective ones of the cells. The inter-cell features include, in various embodiments, one or more similarities of the intra-cell features for nearby ones of the cells, distances between cells, similarities of color distributions, a KL divergence associated with semantic values projected onto the cells from a semantic inference model, a cosine/sine similarity distance between the normal angles of the cells, a cosine similarity/distance, and/or another comparative attribute that characterizes the relationship between cells. The sensor module 220, in one approach, generates a feature vector for each cell that includes the cell features in addition to, for example, a grid cell location. The feature vectors define a descriptive embedding for the cells within a feature space of the point cloud. It should be appreciated that the feature vectors function to improve the efficiency of determining the clusters by, for example, alleviating the computational requirements associated with independently determining a cluster for each separate point in the point cloud. That is, by effectively summarizing the attributes of a group of points through the use of the cells, the system 170 reduces the complexity of the point cloud through the representation of the grid.

Furthermore, the feature vectors function as electronic inputs to subsequent aspects of the clustering process. For example, in one approach, the clustering module 230 generally includes instructions that function to control the processor 110 to execute various actions to cluster the cells, including using the feature vectors as inputs to the clustering model 260. In one embodiment, the clustering module 230 analyzes the feature vectors according to a clustering model 260 to identify clusters 270 for the cells. To achieve this, the clustering module 230 employs the clustering model 260, which is a machine learning algorithm that is trained to determine similarities between cells and suggest clusters 270 for the cells according to the similarities. The clustering model 260 is a machine learning model that performs similarity learning and is one of a deep neural network (DNN), a decision tree, a boosting algorithm, a support vector machine (SVM) or another machine learning algorithm that can process the feature vectors into determinations about the clusters 270. In one or more approaches, the clustering system 170 or another system (e.g., separate cloud-based system) trains the clustering model 260 using a supervised training process that leverages labeled ground truth data (i.e., labeled hulls). The ground truth data may be produced via simulation, collection and manual annotation, collection and automated annotation via a robust machine learning algorithm, and so on. In any case, the supervised training process uses the annotations as a point of comparison against results produced by the clustering model 260 for the same data via a loss function. The training can then penalize the model 260 for results that do not match the annotations while rewarding the model for results that do match. In this way, the clustering model 260 is trained to recognize the clusters according to the feature vectors provided as inputs.

It should be appreciated that the clustering module 230, in combination with the clustering model 260, can be integrated to form a computational model (i.e., machine learning algorithm). Accordingly, the clustering module 230 in concert with the model 260 produce various determinations/assessments as an electronic output that characterizes the noted aspect. In other words, the clustering module 230 uses the cluster model 260 to evaluate the cells of the grid in order to identify which of the cells belong to common clusters 270. For example, the clustering model 260 learns weights for the various cell features of the feature vector and scores the cells to determine which of the cells to connect into the clusters 270. That is, the clustering model 260 iteratively compares the different cells to determine which are sufficiently similar to group into a same cluster. Thus, the clustering model 260 identifies, for example, which of the clusters (i.e., groups of cells) have attributes that correlate with different cells. Of course, the clustering model 260 may, in further embodiments, instead of providing a binary decision about the grouping of cells into clusters, the model 260 may be implemented as a connected components algorithm, Density-based spatial clustering of applications with noise (DBScan) algorithm, Mean Shift algorithm, or another processing approach that characterizes the cells in relaiton to possible clusters/associations instead of providing discrete binary determinations.

Furthermore, the clustering model 260 learns to cluster the cells according to, in one embodiment, a supervised training process that involves similarity learning. For example, the clustering system 170 may use a set of training data that includes point clouds annotated with defined clusters. The clustering system 170 can then execute the model 260 over the annotated point clouds to produce inferred clusters from which the system 170 can apply a loss function using the annotations to determine an accuracy of the output of the model 260. The clustering system 170 then uses a loss from the loss function to update hyper-parameters of the clustering model 260 in order to update the model 260. The clustering system 170 can iteratively perform this process over a large number of training examples to learn weights for the cell features and how to determine which cells to connect and which cell not to connect.

Accordingly, the clustering model 260, in one approach, outputs cluster assignments to the clusters 270 for the separate cells according to the assessment of the feature vectors. Additionally, it should be appreciated that the clusters 270 are, in one embodiment, simply an abstraction of the point cloud/grid that characterizes associated points as belonging to a particular entity in the surrounding environment. Of course, in further aspects, the system 170 may segment the separate clusters 270 from the point cloud or use the clusters 270 as a manner of, for example, performing additional functions on a subset of points in the point cloud.

In various approaches, the clustering module 230 may provide the clusters 270 to further functional components (e.g., autonomous driving module 160) in order to classify, track, map, or perform other functions in relation to entities (e.g., objects) embodied by the clusters 270. In yet a further approach, the clustering module 230 may independently classify the clusters 270 to identify a semantic class for the entities associated with the clusters, track the entities via the clusters between separate acquisitions of the point cloud, map the surrounding environment according to at least the clusters, and/or perform other functions using the clusters in support of the vehicle 100.

Figure 3:
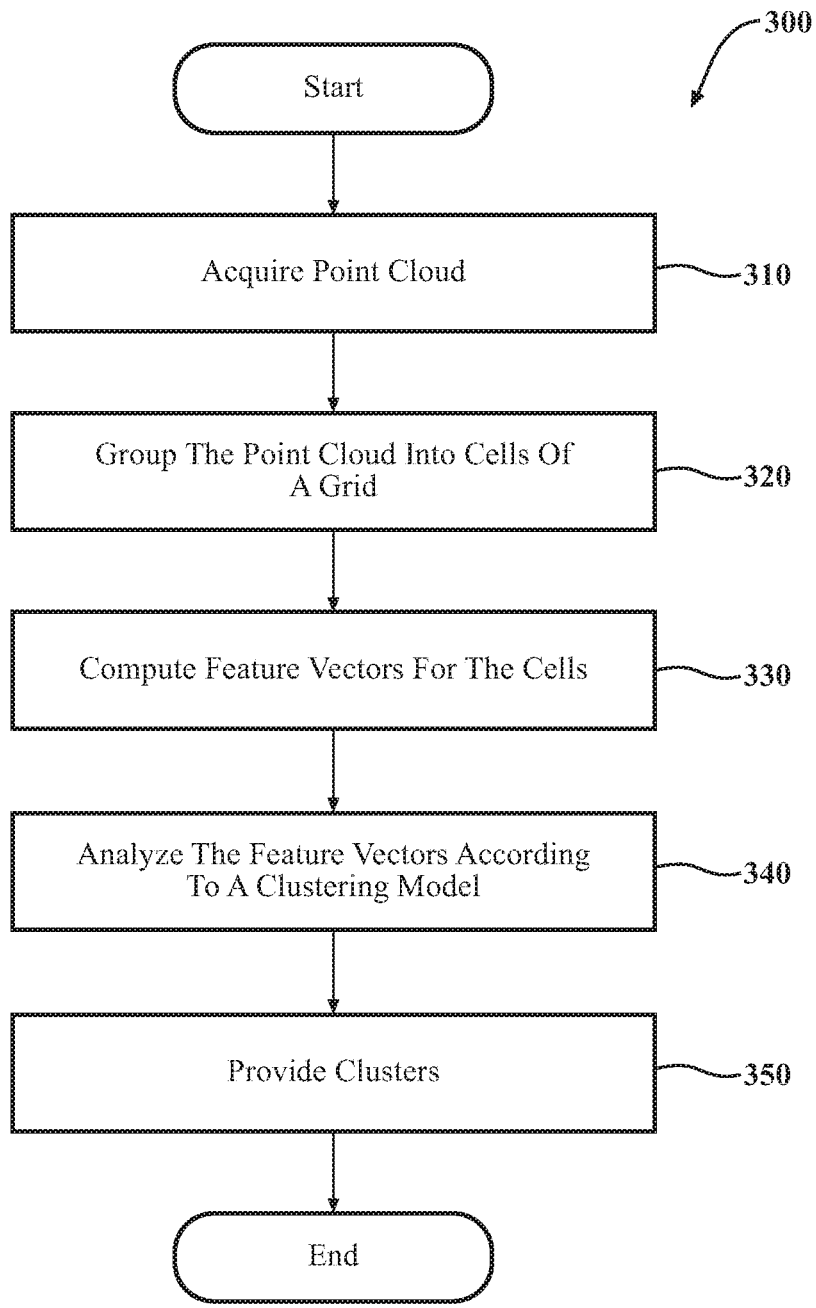
FIG. 3 is a flowchart of one embodiment of a method associated with clustering points within a point cloud.

Additional aspects of clustering points in a point cloud will be discussed in relation to FIG. 3. FIG. 3 illustrates a flowchart of a method 300 that is associated with improving the clustering of points within a point cloud. Method 300 will be discussed from the perspective of the clustering system 170 of FIGS. 1-2. While method 300 is discussed in combination with the clustering system 170, it should be appreciated that the method 300 is not limited to being implemented within the clustering system 170 but is instead one example of a system that may implement the method 300.

At 310, the sensor module 220 acquires the sensor data 250. In one embodiment, the clustering module 230 acquires the sensor data 250 locally from co-located systems with the clustering system 170 (e.g., the camera 126), while in further embodiments, the clustering module 230 may acquire the sensor data 250 through a communication link with a remote system. Thus, while the clustering system 170 can be implemented within a particular device that is, for example, actively navigating an environment, the clustering system 170 may also function as a cloud-based computing service to analyze point cloud data or as a statically mounted device in an environment (e.g., mounted to a traffic signal). As previously described, the sensor data 250 itself may have different characteristics according to different implementations but generally includes or at least provides for deriving a point cloud.

At 320, the sensor module 220 groups the points into cells of a grid. In one embodiment, grouping the points into the cells includes initially generating the grid. Thus, the sensor module 220 may divide an observed region of a surrounding environment associated with the point cloud into the cells to generate the grid. The grid itself serves, in one approach, as a spatial index over a geometric space corresponding with a field-of-view (FOV) of an observing sensor. Alternatively, the sensor module 220 may voxelize the point cloud. In either case, the sensor module 220 groups the points into a separate reference mechanism to simplify subsequent analysis.

At 330, the sensor module 220 computes feature vectors for the cells or voxels. That is, the sensor module 220 separately analyzes the cells according to a set of criteria to define cell features for the cells that generally characterize attributes of the cells. The sensor module 220, in one approach, organizes the cell features into the feature vectors to provide a description about the cell for subsequent processing. It should be appreciated that the feature vectors may include different types of cell features, such as intra-cell features that identify attributes of the cells themselves and inter-cell features that identify attributes between respective ones of the cells. The particular cell features may vary according to different implementations but generally include aspects that facilitate comparing cells and determining which cells correspond to a common entity (i.e., a cluster).

At 340, the clustering module 230 analyzes the feature vectors according to the clustering model 260. In one embodiment, the clustering model 260 identifies clusters for the cells according to the feature vectors. Thus, the clustering module 230, in combination with the clustering model 260, generally functions to score the cells in relation to whether separate cells should be connected together into a cluster or not. As such, the model 260 is, in one approach, producing a similarity score to determine how to cluster the cells. In any case, the clustering module 230 produces an assignment of cells to clusters as a result of analyzing the feature vectors.

At 350, the clustering module 230 provides the clusters as assignments of the points to the entities embodied in the point cloud. As should be appreciated, in one embodiment, the clustering module 230 electronically provides the clusters to other systems of the vehicle 100 in support of, for example, autonomous planning and navigation of the vehicle 100. Of course, in further implementations, the clustering module 230 communicates the clusters to a remote device that originally provided the sensor data 250 as a response to an original request.

In general, the clustering system 170 and the clustering model 260 can be employed in various contexts in support of active autonomous navigation, scene analysis, metadata analysis (e.g., traffic analysis), and so on. In either case, the approach embodied within the clustering system 170 provides a unique and improved approach to more efficiently processing point cloud data in order to facilitate further processes, such as classifying objects/components of the environment depicted by the clusters, tracking entities via the clusters between separate acquisitions of the point cloud, mapping the surrounding environment according to at least the clusters, and so on.

Figure 4:
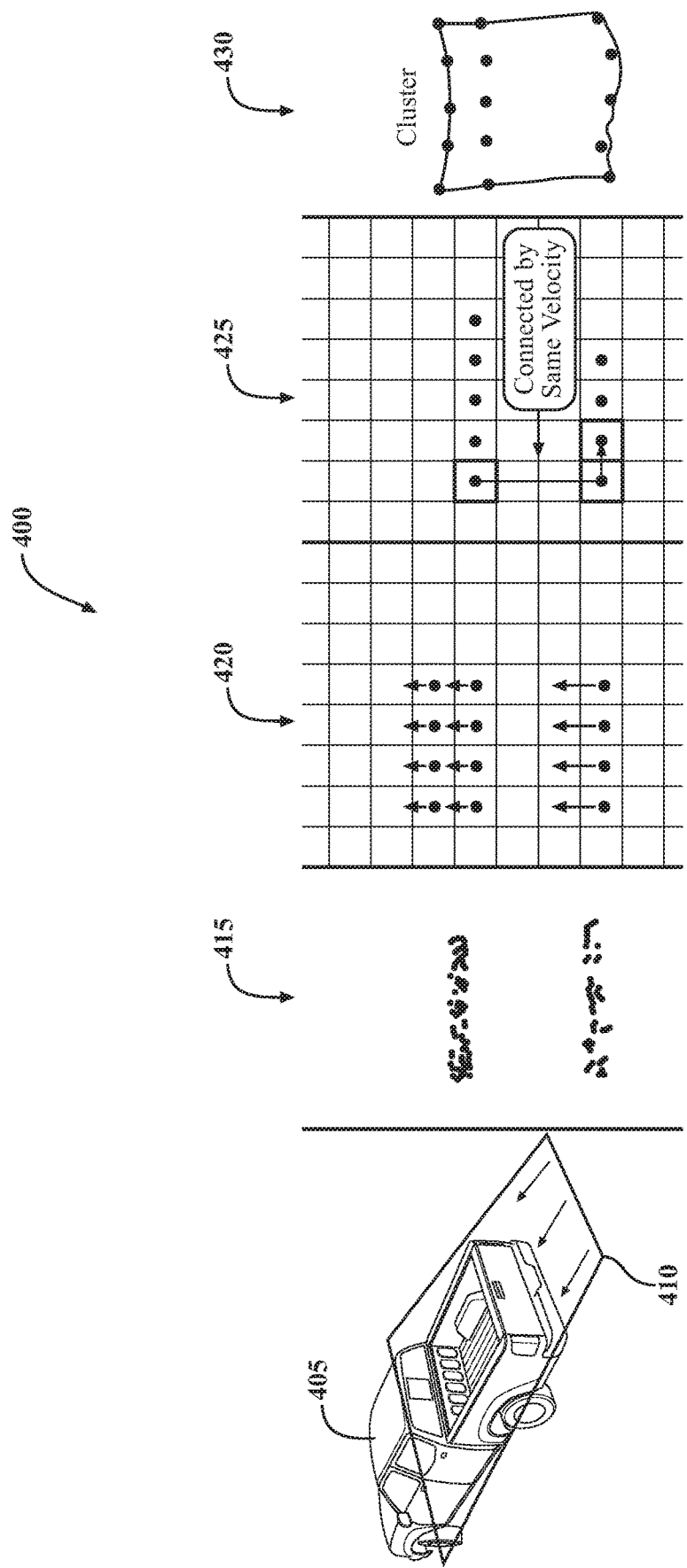
FIG. 4 illustrates a diagram of one example of clustering points associated with a truck.
Figure 5:
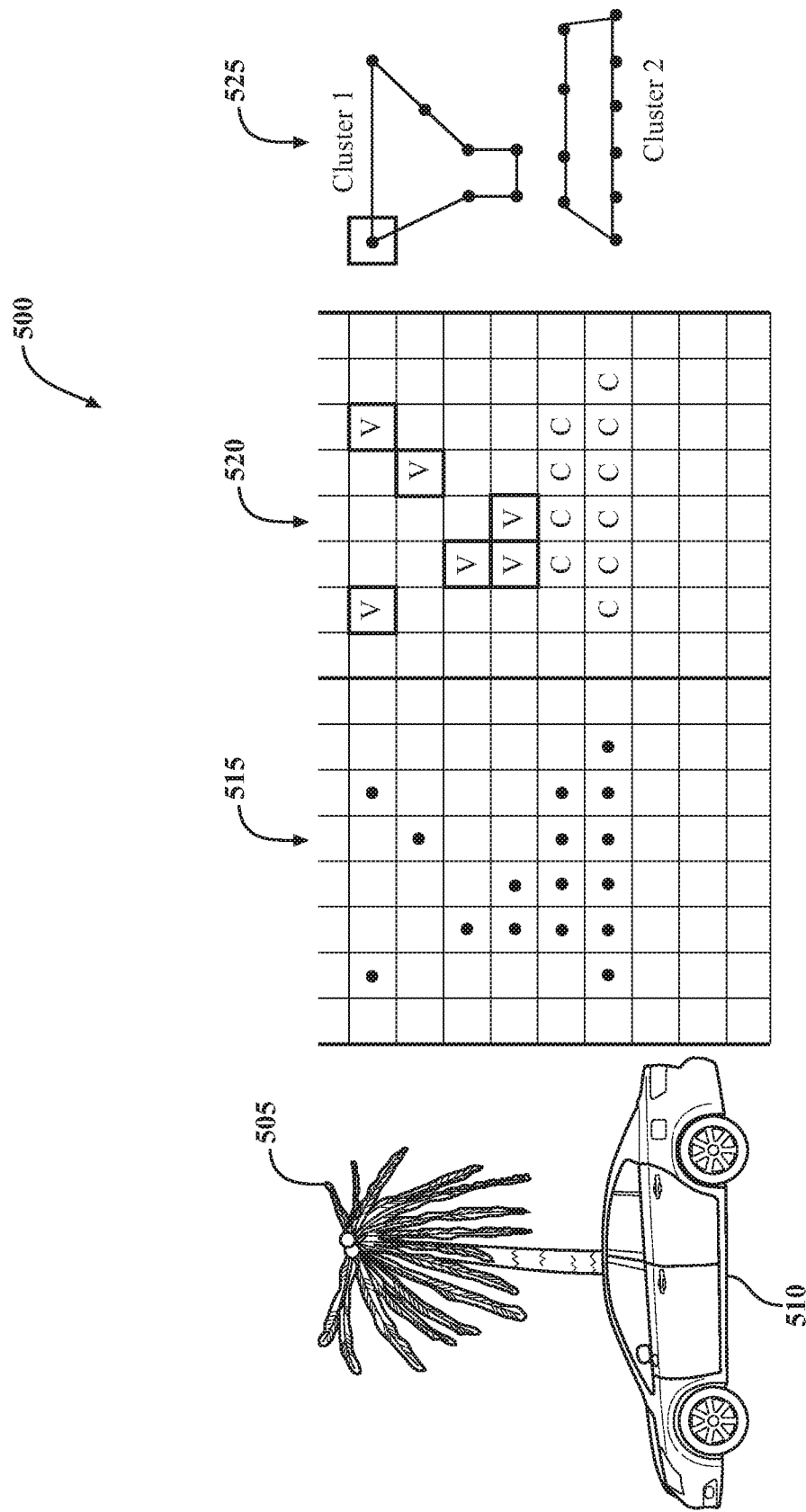
FIG. 5 illustrates a diagram of one example of clustering points associated with two neighboring entities.

Further explanation of how the clustering system 170 groups points and identifies clusters will be described in relation to examples that are illustrated in FIGS. 4-5. FIG. 4 illustrates an example 400 of how an object 405 (a pickup truck) is perceived by a LiDAR and subsequently clustered. In particular, the example 400 illustrates the pickup 405 as perceived according to a field-of-view 410 for a LiDAR sensor. Thus, the FOV 410 indicates that the LiDAR is perceiving the vehicle 405 from a rear position. As such, the perceived point cloud 415 is generally comprised of two separate sets of points that correspond with a tailgate and a rear cab area of the pickup 405 due to the perspective of the LiDAR sensor. Thus, the two separate sets of points are separate by a distance of the truck bed and may appear to belong to separate clusters when the sets actually belong to a single entity. Accordingly, the clustering system 170 overcomes this apparent difficulty through the grouping of points into cells of a grid and analysis of feature vectors for the cells. As such, block 420 illustrates a grid overlaid onto the point cloud and further illustrates cell features for each cell.

The cell features are illustrated for purposes of discussion and include velocity indicators for each cell. Thus, the clustering system 170 produces the grid as shown at block 420 and processes the grid as shown at block 425. That is, the system 170 applies the clustering model 260 to the grid, which analyzes the cells for similarities. In this illustrated instance, the clustering model 260 connects all of the shown cells due to the common velocity among the cells, even though the cells have an apparent discontinuity from the separation in distance. Accordingly, the clustering system 170 assigns the cells to a single cluster, as shown at block 430.

With reference to FIG. 5, a further example 500, including two separate objects in close proximity, is illustrated. The example 500 illustrates a tree 505 that is partially occluded by a passing vehicle 510. Accordingly, from the viewpoint of the sensor, the tree 505 and the vehicle 510 may appear to be connected due to the proximity of the objects even though they are two separate objects. For example, as shown at block 515, the separate points of the point cloud are closely disbursed with no immediately apparent way of distinguishing that the points actually belong to two separate entities. Accordingly, in one example, the clustering system 170 overlays the grid, as shown, onto the point cloud and, thus, groups the points into respective cells. The clustering system 170 can then determine cell features that, for example, predominantly characterize the points within the separate cells. As shown at block 520, the cells have been associated with separate semantic classes as derived via, for example, a separate processing pipeline. That is, the clustering system 170 may receive determinations of semantic classes for different regions of the point cloud according to information derived from images or another source.

In any case, the semantic classes inform the clustering system 170 about which of the cells should be connected and which should not. That is, feature vectors for the separate cells are input into the clustering model 260, which proceeds to evaluate the cell features according to learned weights. In example 500, the cell features include only a single feature for purposes of discussion, i.e., the semantic class. In further approaches, the cell features include further components. In any case, the clustering module 260 evaluates the semantic classes and can identify that even though the separate cells abut one another, the cells belong to separate semantic classes and are thus distinct. Accordingly, as shown in block 520, the clustering system 170 distinguishes between the separate cells and clusters the cells, as shown at block 525. The clustering system 170 clusters together the disparate Vegetation Cells due to their proximity and having the same semantic class (Cluster 1 in block 525). Similarly, the clustering system clusters the various cells of the vehicle without clustering the abutting cells of the vegetation due to at least the distinction provided via the different semantic classes. In this way, the clustering system 170 improves the way in which points from a point cloud are clustered.

FIG. 1 will now be discussed in full detail as an example environment within which the system and methods disclosed herein may operate. In some instances, the vehicle 100 is configured to switch selectively between an autonomous mode, one or more semi-autonomous operational modes, and/or a manual mode. Such switching can be implemented in a suitable manner, now known or later developed. "Manual mode" means that all of or a majority of the navigation and/or maneuvering of the vehicle is performed according to inputs received from a user (e.g., human driver). In one or more arrangements, the vehicle 100 can be a conventional vehicle that is configured to operate in only a manual mode.

In one or more embodiments, the vehicle 100 is an autonomous vehicle. As used herein, "autonomous vehicle" refers to a vehicle that operates in an autonomous mode. "Autonomous mode" refers to navigating and/or maneuvering the vehicle 100 along a travel route using one or more computing systems to control the vehicle 100 with minimal or no input from a human driver. In one or more embodiments, the vehicle 100 is highly automated or completely automated. In one embodiment, the vehicle 100 is configured with one or more semi-autonomous operational modes in which one or more computing systems perform a portion of the navigation and/or maneuvering of the vehicle along a travel route, and a vehicle operator (i.e., driver) provides inputs to the vehicle to perform a portion of the navigation and/or maneuvering of the vehicle 100 along a travel route.

The vehicle 100 can include one or more processors 110. In one or more arrangements, the processor(s) 110 can be a main processor of the vehicle 100. For instance, the processor(s) 110 can be an electronic control unit (ECU). The vehicle 100 can include one or more data stores 115 for storing one or more types of data. The data store 115 can include volatile and/or non-volatile memory. Examples of suitable data stores 115 include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The data store 115 can be a component of the processor(s) 110, or the data store 115 can be operatively connected to the processor(s) 110 for use thereby. The term "operatively connected," as used throughout this description, can include direct or indirect connections, including connections without direct physical contact.

In one or more arrangements, the one or more data stores 115 can include map data 116. The map data 116 can include maps of one or more geographic areas. In some instances, the map data 116 can include information or data on roads, traffic control devices, road markings, structures, features, and/or landmarks in the one or more geographic areas. The map data 116 can be in any suitable form. In some instances, the map data 116 can include aerial views of an area. In some instances, the map data 116 can include ground views of an area, including 360-degree ground views. The map data 116 can include measurements, dimensions, distances, and/or information for one or more items included in the map data 116 and/or relative to other items included in the map data 116. The map data 116 can include a digital map with information about road geometry. The map data 116 can be high quality and/or highly detailed.

In one or more arrangements, the map data 116 can include one or more terrain maps 117. The terrain map(s) 117 can include information about the ground, terrain, roads, surfaces, and/or other features of one or more geographic areas. The terrain map(s) 117 can include elevation data in the one or more geographic areas. The map data 116 can be high quality and/or highly detailed. The terrain map(s) 117 can define one or more ground surfaces, which can include paved roads, unpaved roads, land, and other things that define a ground surface.

In one or more arrangements, the map data 116 can include one or more static obstacle maps 118. The static obstacle map(s) 118 can include information about one or more static obstacles located within one or more geographic areas. A "static obstacle" is a physical object whose position does not change or substantially change over a period of time and/or whose size does not change or substantially change over a period of time. Examples of static obstacles include trees, buildings, curbs, fences, railings, medians, utility poles, statues, monuments, signs, benches, furniture, mailboxes, large rocks, hills. The static obstacles can be objects that extend above ground level. The one or more static obstacles included in the static obstacle map(s) 118 can have location data, size data, dimension data, material data, and/or other data associated with it. The static obstacle map(s) 118 can include measurements, dimensions, distances, and/or information for one or more static obstacles. The static obstacle map(s) 118 can be high quality and/or highly detailed. The static obstacle map(s) 118 can be updated to reflect changes within a mapped area.

The one or more data stores 115 can include sensor data 119. In this context, "sensor data" means any information about the sensors that the vehicle 100 is equipped with, including the capabilities and other information about such sensors. As will be explained below, the vehicle 100 can include the sensor system 120. The sensor data 119 can relate to one or more sensors of the sensor system 120. As an example, in one or more arrangements, the sensor data 119 can include information on one or more LIDAR sensors 124 of the sensor system 120.

In some instances, at least a portion of the map data 116 and/or the sensor data 119 can be located in one or more data stores 115 located onboard the vehicle 100. Alternatively, or in addition, at least a portion of the map data 116 and/or the sensor data 119 can be located in one or more data stores 115 that are located remotely from the vehicle 100.

As noted above, the vehicle 100 can include the sensor system 120. The sensor system 120 can include one or more sensors. "Sensor" means any device, component and/or system that can detect, and/or sense something. The one or more sensors can be configured to detect, and/or sense in real-time. As used herein, the term "real-time" means a level of processing responsiveness that a user or system senses as sufficiently immediate for a particular process or determination to be made, or that enables the processor to keep up with some external process.

In arrangements in which the sensor system 120 includes a plurality of sensors, the sensors can work independently from each other. Alternatively, two or more of the sensors can work in combination with each other. In such a case, the two or more sensors can form a sensor network. The sensor system 120 and/or the one or more sensors can be operatively connected to the processor(s) 110, the data store(s) 115, and/or another element of the vehicle 100 (including any of the elements shown in FIG. 1). The sensor system 120 can acquire data of at least a portion of the external environment of the vehicle 100 (e.g., nearby vehicles).

The sensor system 120 can include any suitable type of sensor. Various examples of different types of sensors will be described herein. However, it will be understood that the embodiments are not limited to the particular sensors described. The sensor system 120 can include one or more vehicle sensors 121. The vehicle sensor(s) 121 can detect, determine, and/or sense information about the vehicle 100 itself. In one or more arrangements, the vehicle sensor(s) 121 can be configured to detect, and/or sense position and orientation changes of the vehicle 100, such as, for example, based on inertial acceleration. In one or more arrangements, the vehicle sensor(s) 121 can include one or more accelerometers, one or more gyroscopes, an inertial measurement unit (IMU), a dead-reckoning system, a global navigation satellite system (GNSS), a global positioning system (GPS), a navigation system 147, and/or other suitable sensors. The vehicle sensor(s) 121 can be configured to detect, and/or sense one or more characteristics of the vehicle 100. In one or more arrangements, the vehicle sensor(s) 121 can include a speedometer to determine a current speed of the vehicle 100.

Alternatively, or in addition, the sensor system 120 can include one or more environment sensors 122 configured to acquire, and/or sense driving environment data. "Driving environment data" includes data or information about the external environment in which an autonomous vehicle is located or one or more portions thereof. For example, the one or more environment sensors 122 can be configured to detect, quantify and/or sense obstacles in at least a portion of the external environment of the vehicle 100 and/or information/data about such obstacles. Such obstacles may be stationary objects and/or dynamic objects. The one or more environment sensors 122 can be configured to detect, measure, quantify and/or sense other things in the external environment of the vehicle 100, such as, for example, lane markers, signs, traffic lights, traffic signs, lane lines, crosswalks, curbs proximate the vehicle 100, off-road objects, etc.

Various examples of sensors of the sensor system 120 will be described herein. The example sensors may be part of the one or more environment sensors 122 and/or the one or more vehicle sensors 121. However, it will be understood that the embodiments are not limited to the particular sensors described.

As an example, in one or more arrangements, the sensor system 120 can include one or more radar sensors 123, one or more LIDAR sensors 124, one or more sonar sensors 125, and/or one or more cameras 126. In one or more arrangements, the one or more cameras 126 can be high dynamic range (HDR) cameras or infrared (IR) cameras.

The vehicle 100 can include an input system 130. An "input system" includes any device, component, system, element or arrangement or groups thereof that enable information/data to be entered into a machine. The input system 130 can receive an input from a vehicle passenger (e.g., a driver or a passenger). The vehicle 100 can include an output system 135. An "output system" includes any device, component, or arrangement or groups thereof that enable information/data to be presented to a vehicle passenger (e.g., a person, a vehicle passenger, etc.).

The vehicle 100 can include one or more vehicle systems 140. Various examples of the one or more vehicle systems 140 are shown in FIG. 1. However, the vehicle 100 can include more, fewer, or different vehicle systems. It should be appreciated that although particular vehicle systems are separately defined, each or any of the systems or portions thereof may be otherwise combined or segregated via hardware and/or software within the vehicle 100. The vehicle 100 can include a propulsion system 141, a braking system 142, a steering system 143, throttle system 144, a transmission system 145, a signaling system 146, and/or a navigation system 147. Each of these systems can include one or more devices, components, and/or a combination thereof, now known or later developed.

The navigation system 147 can include one or more devices, applications, and/or combinations thereof, now known or later developed, configured to determine the geographic location of the vehicle 100 and/or to determine a travel route for the vehicle 100. The navigation system 147 can include one or more mapping applications to determine a travel route for the vehicle 100. The navigation system 147 can include a global positioning system, a local positioning system, or a geolocation system.

The processor(s) 110, the clustering system 170, and/or the autonomous driving module(s) 160 can be operatively connected to communicate with the various vehicle systems 140 and/or individual components thereof. For example, returning to FIG. 1, the processor(s) 110 and/or the autonomous driving module(s) 160 can be in communication to send and/or receive information from the various vehicle systems 140 to control the movement, speed, maneuvering, heading, direction, etc. of the vehicle 100. The processor(s) 110, the clustering system 170, and/or the autonomous driving module(s) 160 may control some or all of these vehicle systems 140 and, thus, may be partially or fully autonomous.

The processor(s) 110, the clustering system 170, and/or the autonomous driving module(s) 160 can be operatively connected to communicate with the various vehicle systems 140 and/or individual components thereof. For example, returning to FIG. 1, the processor(s) 110, the clustering system 170, and/or the autonomous driving module(s) 160 can be in communication to send and/or receive information from the various vehicle systems 140 to control the movement, speed, maneuvering, heading, direction, etc. of the vehicle 100. The processor(s) 110, the clustering system 170, and/or the autonomous driving module(s) 160 may control some or all of these vehicle systems 140.

The processor(s) 110, the clustering system 170, and/or the autonomous driving module(s) 160 may be operable to control the navigation and/or maneuvering of the vehicle 100 by controlling one or more of the vehicle systems 140 and/or components thereof. For instance, when operating in an autonomous mode, the processor(s) 110, the clustering system 170, and/or the autonomous driving module(s) 160 can control the direction and/or speed of the vehicle 100. The processor(s) 110, the clustering system 170, and/or the autonomous driving module(s) 160 can cause the vehicle 100 to accelerate (e.g., by increasing the supply of fuel provided to the engine), decelerate (e.g., by decreasing the supply of fuel to the engine and/or by applying brakes) and/or change direction (e.g., by turning the front two wheels). As used herein, "cause" or "causing" means to make, force, compel, direct, command, instruct, and/or enable an event or action to occur or at least be in a state where such event or action may occur, either in a direct or indirect manner.

The vehicle 100 can include one or more actuators 150. The actuators 150 can be any element or combination of elements operable to modify, adjust and/or alter one or more of the vehicle systems 140 or components thereof to responsive to receiving signals or other inputs from the processor(s) 110 and/or the autonomous driving module(s) 160. Any suitable actuator can be used. For instance, the one or more actuators 150 can include motors, pneumatic actuators, hydraulic pistons, relays, solenoids, and/or piezoelectric actuators, just to name a few possibilities.

The vehicle 100 can include one or more modules, at least some of which are described herein. The modules can be implemented as computer-readable program code that, when executed by a processor 110, implement one or more of the various processes described herein. One or more of the modules can be a component of the processor(s) 110, or one or more of the modules can be executed on and/or distributed among other processing systems to which the processor(s) 110 is operatively connected. The modules can include instructions (e.g., program logic) executable by one or more processor(s) 110. Alternatively, or in addition, one or more data store 115 may contain such instructions.

In one or more arrangements, one or more of the modules can be distributed among a plurality of the modules described herein. In one or more arrangements, two or more of the modules described herein can be combined into a single module.

The vehicle 100 can include one or more autonomous driving modules 160. The autonomous driving module(s) 160 can be configured to receive data from the sensor system 120 and/or any other type of system capable of capturing information relating to the vehicle 100 and/or the external environment of the vehicle 100. In one or more arrangements, the autonomous driving module(s) 160 can use such data to generate one or more driving scene models. The autonomous driving module(s) 160 can determine position and velocity of the vehicle 100. The autonomous driving module(s) 160 can determine the location of obstacles, obstacles, or other environmental features including traffic signs, trees, shrubs, neighboring vehicles, pedestrians, etc.

The autonomous driving module(s) 160 can be configured to receive, and/or determine location information for obstacles within the external environment of the vehicle 100 for use by the processor(s) 110, and/or one or more of the modules described herein to estimate position and orientation of the vehicle 100, vehicle position in global coordinates based on signals from a plurality of satellites, or any other data and/or signals that could be used to determine the current state of the vehicle 100 or determine the position of the vehicle 100 with respect to its environment for use in either creating a map or determining the position of the vehicle 100 in respect to map data.

The autonomous driving module(s) 160 either independently or in combination with the clustering system 170 can be configured to determine travel path(s), current autonomous driving maneuvers for the vehicle 100, future autonomous driving maneuvers and/or modifications to current autonomous driving maneuvers based on data acquired by the sensor system 120, driving scene models, and/or data from any other suitable source. "Driving maneuver" means one or more actions that affect the movement of a vehicle. Examples of driving maneuvers include: accelerating, decelerating, braking, turning, moving in a lateral direction of the vehicle 100, changing travel lanes, merging into a travel lane, and/or reversing, just to name a few possibilities. The autonomous driving module(s) 160 can be configured to implement determined driving maneuvers. The autonomous driving module(s) 160 can cause, directly or indirectly, such autonomous driving maneuvers to be implemented. As used herein, "cause" or "causing" means to make, command, instruct, and/or enable an event or action to occur or at least be in a state where such event or action may occur, either in a direct or indirect manner. The autonomous driving module(s) 160 can be configured to execute various vehicle functions and/or to transmit data to, receive data from, interact with, and/or control the vehicle 100 or one or more systems thereof (e.g., one or more of vehicle systems 140).

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-5, but the embodiments are not limited to the illustrated structure or application.

The flowcharts and block diagrams in the Figures illustrate the architecture, functionality, and operation of possible implementations of systems, methods, and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suited. A typical combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: a portable computer diskette, a hard disk drive (HDD), a solid-state drive (SSD), a read-only memory (ROM), an erasable programmable read-only memory (EPROM or Flash memory), a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

Generally, module, as used herein, includes routines, programs, objects, components, data structures, and so on that perform particular tasks or implement particular data types. In further aspects, a memory generally stores the noted modules. The memory associated with a module may be a buffer or cache embedded within a processor, a RAM, a ROM, a flash memory, or another suitable electronic storage medium. In still further aspects, a module as envisioned by the present disclosure is implemented as an application-specific integrated circuit (ASIC), a hardware component of a system on a chip (SoC), as a programmable logic array (PLA), or as another suitable hardware component that is embedded with a defined configuration set (e.g., instructions) for performing the disclosed functions.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object-oriented programming language such as Java™ Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . " as used herein refers to and encompasses any and all possible combinations of one or more of the associated listed items. As an example, the phrase "at least one of A, B, and C" includes A only, B only, C only, or any combination thereof (e.g., AB, AC, BC or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. A clustering system for improving clustering of points within a point cloud, comprising:
   one or more processors;
   a memory communicably coupled to the one or more processors and storing:
   a sensor module including instructions that, when executed by the one or more processors, cause the one or more processors to group the points into cells of a grid, the grid dividing an observed region of a surrounding environment associated with the point cloud into the cells, and
   computing feature vectors for the cells that use cell features to characterize the points in the cells that are intra-cell features that identify attributes of respective points within respective ones of the cells, and relationships between the cells that are inter-cell features; and
   a clustering module including instructions that, when executed by the one or more processors, cause the one or more processors to:
   analyze the feature vectors according to a clustering model to identify clusters for assigning the cells, wherein the clustering model evaluates the cells according to the feature vectors to identify which of the cells belong to common entities, and
   provide the clusters as assignments of the points to the common entities depicted in the point cloud.

2. The clustering system of claim 1, wherein the feature vectors separately summarize the attributes of groups of the points within the respective cells, wherein the sensor module includes instructions to compute the cell features in the feature vectors for respective ones of the cells including instructions to generate the inter-cell features and the intra-cell features,
   wherein the intra-cell features identify attributes of respective ones of the cells as defined according to a grouping of respective ones of the points,
   wherein the inter-cell features identify relative attributes between respective ones of the cells, and
   wherein the feature vectors define a descriptive embedding for the cells within a feature space and provide for clustering without separately analyzing individual points.

3. The clustering system of claim 2, wherein the intra-cell features include one or more of: cell coordinates, an RGB value, a LiDAR intensity value, a normal, scene flow, a distance to a sensor, radar reflectivity, a level of free space, texture, staticness, rasterized boundary information,
   wherein the inter-cell features include one or more of: one or more similarities of the intra-cell features for nearby ones of the cells, distances, similarities of color distributions, a KL divergence associated with semantic values projected onto the cells from a semantic inference model, vector between normals of the nearby ones of the cells, and a cosine similarity/distance.

4. The clustering system of claim 1, wherein the clustering module includes instructions to analyze the feature vectors according to the clustering model including instructions to score the cell features for the cells to determine which of the cells to connect into the clusters, and
   wherein the clustering model identifies which of the clusters predominate for a respective one of the cells according to learned weights for the cell features.

5. The clustering system of claim 1, wherein the clustering model is a machine learning model that performs similarity learning and is one of a deep neural network (DNN), a decision tree, a boosting algorithm, a support vector machine (SVM).

6. The clustering system of claim 1, wherein the sensor module includes instructions to group the points into the cells including instructions to define the grid as a spatial index over a geometric space corresponding to the surrounding environment within a field-of-view of at least one sensor, the cells defining separate discrete spaces within the grid, and
   wherein the grid is one of a two-dimensional and a three-dimensional grid.

7. The clustering system of claim 1, the sensor module includes instructions to acquire the point cloud via one or more sensors of a vehicle, and to fuse raw data from two or more sensors together with the points of the point cloud.

8. The clustering system of claim 1, wherein the clustering module includes instructions to provide the clusters including instructions to perform at least one of: classifying the clusters to identify a semantic class for the entities associated with the clusters, tracking the entities via the clusters between separate acquisitions of the point cloud, and mapping the surrounding environment according to at least the clusters.

9. A non-transitory computer-readable medium for improving clustering of points within a point cloud and including instructions that, when executed by one or more processors, cause the one or more processors to:
group the points into cells of a grid, the grid dividing an observed region of a surrounding environment associated with the point cloud into the cells; and
computing feature vectors for the cells that use cell features to characterize the points in the cells that are intra-cell features that identify attributes of respective points within respective ones of the cells, and relationships between the cells that are inter-cell features,
analyze the feature vectors according to a clustering model to identify clusters for assigning the cells, wherein the clustering model evaluates the cells according to the feature vectors to identify which of the cells belong to common entities, and
provide the clusters as assignments of the points to the entities depicted in the point cloud.

10. The non-transitory computer-readable medium of claim 9, wherein the feature vectors separately summarize the attributes of groups of the points within the respective cells, wherein the instructions to compute the cell features in the feature vectors for respective ones of the cells include instructions to generate the inter-cell features and the intra-cell features,
wherein the intra-cell features identify attributes of respective ones of the cells as defined according to a grouping of respective ones of the points,
wherein the inter-cell features identify relative attributes between respective ones of the cells, and
wherein the feature vectors define a descriptive embedding for the cells within a feature space and provide for clustering without separately analyzing individual points.

11. The non-transitory computer-readable medium of claim 10, wherein the intra-cell features include one or more of: cell coordinates, an RGB value, a LiDAR intensity value, a normal, scene flow, a distance to a sensor, radar reflectivity, a level of free space, texture, staticness, rasterized boundary information,
wherein the inter-cell features include one or more of: one or more similarities of the intra-cell features for nearby ones of the cells, distances, similarities of color distributions, a KL divergence associated with semantic values projected onto the cells from a semantic inference model, vector between normals of the nearby ones of the cells, and a cosine similarity/distance.

12. The non-transitory computer-readable medium of claim 9, wherein the instructions to analyze the feature vectors according to the clustering model include instructions to score the cell features for the cells to determine which of the cells to connect into the clusters, and
wherein the clustering model identifies which of the clusters predominate for a respective one of the cells according to learned weights for the cell features.

13. The non-transitory computer-readable medium of claim 9, wherein the instructions to group the points into the cells include instructions to define the grid as a spatial index over a geometric space corresponding to the surrounding environment within a field-of-view of at least one sensor, the cells defining separate discrete spaces within the grid, and wherein the grid is one of a two-dimensional and a three-dimensional grid.

14. A method of improving clustering of points within a point cloud, comprising:
grouping the points into cells of a grid, the grid dividing an observed region of a surrounding environment associated with the point cloud into the cells;
computing feature vectors for the cells that use cell features to characterize the points in the cells that are intra-cell features that identify attributes of respective points within respective ones of the cells, and relationships between the cells that are inter-cell features;
analyzing the feature vectors according to a clustering model to identify clusters for assigning the cells, wherein the clustering model evaluates the cells according to the feature vectors to identify which of the cells belong to common entities; and
providing the clusters as assignments of the points to the entities depicted in the point cloud.

15. The method of claim 14, wherein the feature vectors separately summarize the attributes of groups of the points within the respective cells, wherein generating the cell features in the feature vectors for respective ones of the cells includes generating inter-cell features and the intra-cell features,
wherein the intra-cell features identify the attributes of respective ones of the cells as defined according to a grouping of respective ones of the points,
wherein the inter-cell features identify relative attributes between respective ones of the cells, and
wherein the feature vectors define a descriptive embedding for the cells within a feature space and provide for clustering without separately analyzing individual points.

16. The method of claim 15, wherein the intra-cell features include one or more of:
cell coordinates, an RGB value, a LiDAR intensity value, a normal, scene flow, a distance to a sensor, radar reflectivity, a level of free space, texture, staticness, rasterized boundary information,
wherein the inter-cell features include one or more of: one or more similarities of the intra-cell features for nearby ones of the cells, distances, similarities of color distributions, a KL divergence associated with semantic values projected onto the cells from a semantic inference model, vector between normals of the nearby ones of the cells, and a cosine similarity/distance.

17. The method of claim 14, wherein analyzing the feature vectors according to the clustering model includes scoring the cell features for the cells to determine which of the cells to connect into the clusters, and
wherein the clustering model identifies which of the clusters predominate for a respective one of the cells according to learned weights for the cell features.

18. The method of claim 14, wherein the clustering model is a machine learning model that performs similarity learning and is one of a deep neural network (DNN), a decision tree, a boosting algorithm, a support vector machine (SVM).

19. The method of claim 14, wherein grouping the points into the cells includes defining the grid as a spatial index over a geometric space corresponding to the surrounding environment within a field-of-view of at least one sensor, the cells defining separate discrete spaces within the grid, wherein the grid is one of a two-dimensional and a three-dimensional grid, and
wherein the points of the point cloud include raw data fused from two or more sensors.

20. The method of claim 14, further comprising:

acquiring the point cloud via one or more sensors of a vehicle, wherein providing the clusters includes at least one of: using the clusters as an input to a classifying algorithm that identifies a semantic class for the entities associated with the clusters, tracking the entities via the clusters between separate acquisitions of the point cloud, mapping the surrounding environment according to at least the clusters.

* * * * *